March 18, 1958   L. D. SOUBIER   2,826,870
GLASS ARTICLE HOLDING CHUCK
Filed Sept. 20, 1955
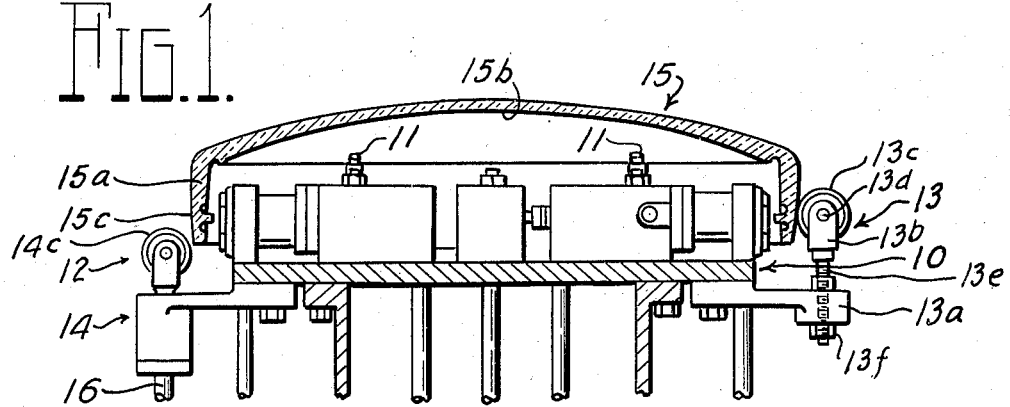
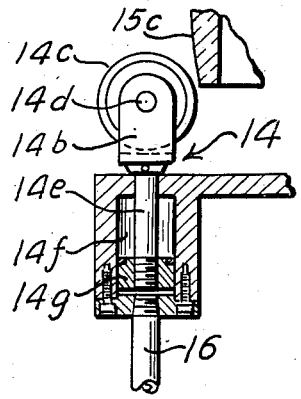
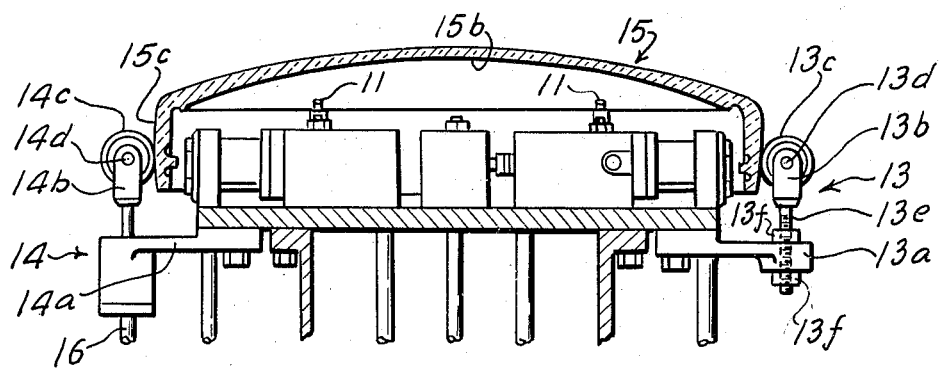
INVENTOR.
L. D. SOUBIER
BY
W. A. Schaich
ATTORNEY United States Patent Office 2,826,870
Patented Mar. 18, 1958

2,826,870
GLASS ARTICLE HOLDING CHUCK

Leonard D. Soubier, Toledo, Ohio, assignor to Owens-Illinois Glass Company, a corporation of Ohio Application September 20, 1955, Serial No. 535,403

2 Claims. (Cl. 49—64)

This invention relates to an improved apparatus for positioning and clamping bulky articles of frangible natures, and particularly to an improved chunk for positioning a glass face plate for a cathode ray tube so that certain manufacturing operations can be performed thereon.

In the copending application of George C. Chapman, Serial No. 535,451, filed September 20, 1955, and assigned to the assignee of this invention, there is disclosed an apparatus for producing integral projections on the internal surfaces of a glass face plate for cathode ray tubes. The successful functioning of such an apparatus depends in large measure upon the means provided for accurately positioning and clamping the glass face plate with respect to the projection forming elements. Glass face plates for television tubes are not only bulky and awkward to handle, but are of substantial weight and, due to their relatively fragile characteristics, they cannot be positioned by ordinary forms of clamping devices.

Accordingly it is an object of this invention to provide an improved chuck for accurately positioning a glass article.

A particular object of this invention is to provide an improved positioning and clamping device for a face plate of a cathode ray tube which will accurately and securely position successive face plates so that further manufacturing operations can be performed on such successive face plate with substantially identical results.

The specific nature of this invention, as well as other objects and advantages thereof, will become apparent to those skilled in the art from the following detailed description, taken in conjunction with the annexed sheet of drawings, on which, by way of preferred example only, is illustrated one embodiment of this invention.

On the drawings:

Figure 1 is a side elevational view, partly in section, of a positioning and clamping device for glass face plates embodying this invention.

Figure 2 is a vertical sectional view of the movable roller clamping element incorporated in the apparatus of Figure 1, showing such element in its inactive position.

Figure 3 is a view similar to Figure 2 but showing the roller clamping element in its operative position with respect to a glass face plate.

Reference numeral 10 refers to a bed plate of a machine for forming projections on the internal surfaces of glass face plates for cathode ray tubes. Such machine is more completely described and claimed in the above referred to copending application of George C. Chapman. For the purposes of this application, it is sufficient to mention that such machine incorporates a plurality of fixed locating buttons 11 which are adapted to engage the internal window surface 15b of a glass face plate 15. As is customary, the face plate 15 has an integral depending peripheral flange 15a which has a tapered external surface 15c. On opposite sides of the supported face plate 15 a plurality of pairs of roller type positioning elements 12 are provided. Generally at least two sets of such roller positioning elements 12 are provided, and each set comprises a fixed roller unit 13 and an adjustable roller unit 14, which are respectively disposed on opposite sides of a supported face plate 15 by brackets 13a and 14a respectively which are secured to bed plate 10. The fixed roller unit 13 comprises a yoke-shaped roller mount 13b, which journals a roller 13c on a transverse pin 13d. Yoke 13b has an integrally threaded stem portion 13e which traverses the supporting bracket 13a and is adjustably fixed with respect to such bracket by a pair of nuts 13f respectively contacting the top and bottom faces of bracket 13a.

The movable roller positioning element 14 includes a yoke 14b journalling a roller 14c on a transverse pin 14d. The supporting bracket 14a defines a vertical axis cylinder chamber 14f, and the stem portion 14e of yoke 14b projects into such cylinder chamber and is secured to a piston 14g. Fluid pressure is supplied to cylinder chamber 14f from a suitable source through a pipe 16.

When the movable roller units 14 are in their inactive positions, as indicated in Figure 2, the rollers 14c are positioned below the tapered external surface 15c of the face plate 15. A face plate 15 may then be inserted between the opposed sets of fixed roller units 13 and movable roller units 14 and supported on the locating buttons 11. Pressured fluid is then supplied through pipes 16 to the cylinder chambers 14f, and the movable rollers 14d are shifted upwardly, rolling along the tapered external surface 15c of the face plate 15 and thus forcing the face plate snugly into engagement with the fixed rollers 13 and achieving a firm clamping action of the face plate between the fixed roller unit 13 and the movable roller units 14. Obviously, if the face plate 15 is of the type whose external surface 15c is not tapered, it will then be necessary to position the movable roller unit 14 so that its path of movement is oblique with respect to the external face plate surface 15c. To release the face plate 15, it is only necessary to cut off the pressured fluid from the cylinder chamber 14f and supply a subatmospheric pressure to such chamber through the pipe 16.

It will of course be understood that various details of construction may be modified through a wide range without departing from the principles of this invention, and it is therefore not the purpose to limit the patent granted hereon otherwise than necessitated by the scope of the appended claims.

I claim:

1. Apparatus for positioning and clamping a glass face plate for a cathode ray tube, said face plate having a tapered peripheral side flange, comprising a plurality of roller mounting units spaced apart to permit a face plate to be inserted therebetween, rollers freely mounted on each said mounting, means fixedly mounting one of said roller mounting units, means for journalling a second roller mounting unit for linear movement substantially parallel to the vertical axis of the inserted face plate and relative to said fixed roller mounting, and means for linearly shifting said journalled roller mounting unit to roll its respective roller to thereby provide an increasing clamping action on the tapered side flange of said face plate.

2. Apparatus for positioning and clamping a glass face plate for a cathode ray tube, said face plate having a peripheral side flange the outer surface areas of which are angularly inclined, said apparatus comprising a horizontal support plate, locating pins thereon adapted to support a face plate in a horizontal plane, a pair of roller mounting units oppositely disposed on said support plate, means fixedly positioning one of said units relative to said horizontal support plate, a roller journalled on said one unit and arranged for free rolling motion thereon, means for journalling the second roller mounting unit for linear movements along a vertical path relative to said horizontal support and said fixed mounting, and means for shifting said second unit along said path to thereby apply a clamping pressure to said side flange intermediate said rollers.

References Cited in the file of this patent

UNITED STATES PATENTS 2,366,337   Kreuter et al. _____ Jan. 2, 1945